United States Patent
Tabata et al.

[11] Patent Number: 5,935,040
[45] Date of Patent: Aug. 10, 1999

[54] HYBRID VEHICLE DRIVE SYSTEM ADAPTED TO PRODUCE SUBSTANTIALLY CONSTANT VEHICLE DRIVE FORCE UNDER THE SAME VEHICLE RUNNING CONDITION, EVEN IN DIFFERENT MODES OF OPERATION

[75] Inventors: Atsushi Tabata, Okazaki; Yutaka Taga, Aichi-ken; Ryuji Ibaraki, Toyota; Hiroshi Hata, Toyota; Tsuyoshi Mikami, Toyota, all of Japan

[73] Assignee: Toyota Jidosha Kabushiki Kaisha, Toyota, Japan

[21] Appl. No.: 08/897,601

[22] Filed: Jul. 21, 1997

[30] Foreign Application Priority Data

Jul. 23, 1996 [JP] Japan .................................. 8-193442

[51] Int. Cl.$^6$ ....................................................... B60K 6/04
[52] U.S. Cl. ............................. 477/3; 180/65.2; 180/65.7
[58] Field of Search ................................ 477/3; 180/65.2, 180/65.7, 65.8

[56] References Cited

U.S. PATENT DOCUMENTS

| | | | |
|---|---|---|---|
| 3,732,751 | 5/1973 | Berman et al. | 180/65.2 X |
| 4,180,138 | 12/1979 | Shea | 180/65.2 |
| 4,306,156 | 12/1981 | Monaco et al. | 180/65.2 X |
| 4,335,429 | 6/1982 | Kawakatsu | 180/65.2 X |
| 5,176,213 | 1/1993 | Kawai et al. | 180/65.2 X |
| 5,713,425 | 2/1998 | Buschhaus et al. | 180/65.2 |
| 5,785,138 | 7/1998 | Yoshida | 180/65.2 |
| 5,786,640 | 7/1998 | Sakai et al. | 180/65.2 X |
| 5,791,426 | 8/1998 | Yammada et al. | 180/65.2 |

FOREIGN PATENT DOCUMENTS

A-3-121928 5/1991 Japan .
A-7-123513 5/1995 Japan .

*Primary Examiner*—Charles A Marmor
*Assistant Examiner*—Scott Lund
*Attorney, Agent, or Firm*—Oliff & Berridge, PLC

[57] ABSTRACT

A hybrid drive system for a motor vehicle, including a drive power source consisting of an engine operated by combustion of a fuel, and an electric motor operated with an electric energy, and a controller for selectively establishing a plurality of operation modes in which the drive power source is placed in respective different operating states, and wherein the controller includes a drive force control device for controlling the hybrid drive system so as to produce a substantially constant drive force for driving the vehicle, under the same running condition of the vehicle, irrespective of the currently established operation mode.

9 Claims, 12 Drawing Sheets

FIG. 3

| SHIFT LEVER | TRANSMISSION | CLUTCHES | | | BRAKES | | | | | ONE-WAY CLUTCHES | | | SPEED RATIO |
|---|---|---|---|---|---|---|---|---|---|---|---|---|---|
| | | $C_0$ | $C_1$ | $C_2$ | $B_0$ | $B_1$ | $B_2$ | $B_3$ | $B_4$ | $F_0$ | $F_1$ | $F_2$ | |
| NEUTRAL | N | ○ | | | | | | | | | | | — |
| REVERSE | Rev | ○ | | ○ | | | | | | | | | −4.550 |
| DRIVE | 1st | ○ | ○ | | | | | | ○ | ○ | | | 3.357 |
| DRIVE | 2nd | ● | ○ | | | | | | ● | ○ | | ○ | 2.180 |
| DRIVE | 3rd | ○ | ○ | | | ● | | ○ | | ○ | ○ | | 1.424 |
| DRIVE | 4th | ○ | ○ | ○ | | | ○ | | | ○ | | | 1.000 |
| DRIVE | 5th | | ○ | ○ | ○ | | ○ | | | | | | 0.753 |

FIG. 7

| MODE | CLUTCHES | | ENGINE 12 | STORAGE DEVICE 58 | MODE NOMENCLATURE |
|---|---|---|---|---|---|
| | CE1 | CE2 | | | |
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGING |
| 4 | ON | ON | ON | DISCHARGED | ENGINE · MOTOR DRIVE |
| 5 | ON | OFF | ON | CHARGED | VEHICLE START BY ENGINE |
| 6 | OFF | ON | OFF | CHARGED | REGENERATIVE BRAKING |
| 7 | ON | OFF | ON | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |

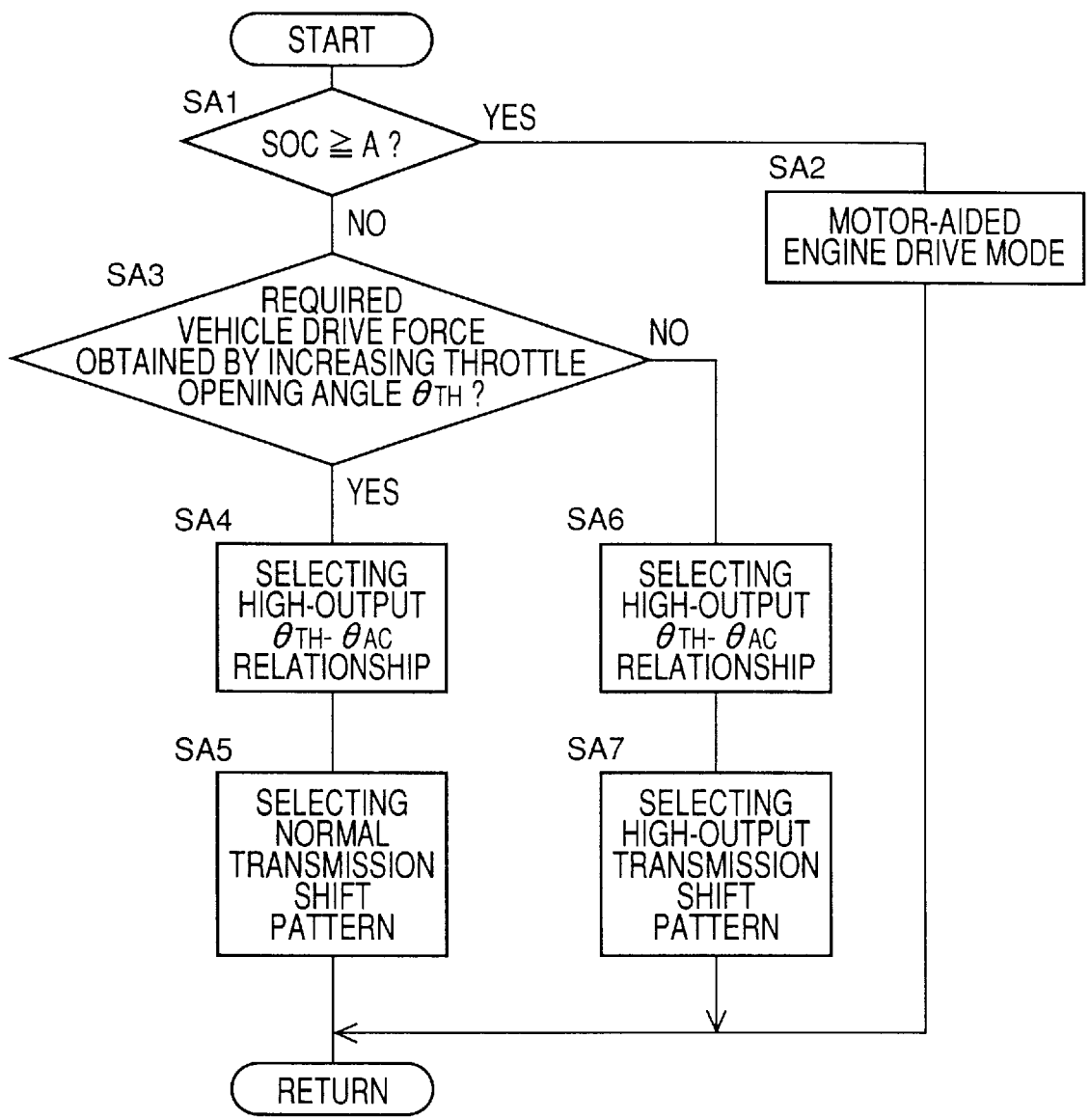

FIG. 13

| SHIFT LEVER | TRANSMISSION | CLUTCHES | | BRAKES | | | | ONE-WAY CLUTCHES | | SPEED RATIO |
|---|---|---|---|---|---|---|---|---|---|---|
| | | $C_1$ | $C_2$ | $B_1$ | $B_2$ | $B_3$ | $B_4$ | $F_1$ | $F_2$ | |
| NEUTRAL | N | | | | | | | | | — |
| REVERSE | Rev | | ○ | | | | ○ | | | −4.550 |
| DRIVE | 1st | ○ | | | | | ● | | ○ | 3.357 |
| DRIVE | 2nd | ○ | | | | ○ | | | | 2.180 |
| DRIVE | 3rd | ○ | | ● | ○ | | | ○ | | 1.424 |
| DRIVE | 4th | ○ | ○ | | ○ | | | | | 1.000 |

HYBRID VEHICLE DRIVE SYSTEM ADAPTED TO PRODUCE SUBSTANTIALLY CONSTANT VEHICLE DRIVE FORCE UNDER THE SAME VEHICLE RUNNING CONDITION, EVEN IN DIFFERENT MODES OF OPERATION

This application is based on Japanese Patent Application No. 8-193442 filed Jul. 23, 1996, the content of which is incorporated hereinto by reference.

BACKGROUND OF THE INVENTION

1. Field of the Invention

The present invention relates in general to a hybrid drive system for driving an automotive vehicle, and more particularly to such a hybrid drive system such that a vehicle drive force is substantially constant under the same vehicle running condition, even in different modes of operation of the hybrid drive system.

2. Discussion of the Related Art

For driving an automotive vehicle, there is known a hybrid drive system including (a) an engine operated by combustion of a fuel, and (b) an electric motor operated with an electric energy, and having a motor-aided engine drive mode in which the engine is used as a primary drive power source while the electric motor is used as an auxiliary drive power source. An example of this type of hybrid drive system is disclosed in JP-A-3-121928. This hybrid drive system has a normal engine drive mode in which only the engine is operated to drive the vehicle, and a motor-aided engine drive mode in which the electric motor is operated together with the engine to drive the vehicle, so that the required drive force or drivability is obtained while minimizing fuel consumption and exhaust gas emissions. The normal engine drive mode is usually or normally selected, and the motor-aided engine drive mode is selected when the vehicle is running under a high load condition, that is, when the load acting on the engine (as represented by an amount of operation of the accelerator pedal, for example) is higher than a predetermined upper limit.

If the electric motor is used as the auxiliary drive power source under any running condition of the vehicle as long as the engine load is higher than the predetermined upper limit, the overall vehicle drive force corresponding to a given amount of operation of the accelerator pedal undesirably varies, unexpectedly to the vehicle operator, depending upon whether the electric motor is inoperable due to excessive reduction of the electric energy amount stored in an electric energy storage device, more precisely, due to reduction of the stored electric energy amount below a predetermined lower limit.

SUMMARY OF THE INVENTION

It is therefore an object of the present invention to provide a hybrid vehicle drive system which has a plurality of operation modes wherein a drive power source is placed in respective different operating states, and which is adapted to provide a substantially constant vehicle drive force under the same vehicle running condition (as represented by the amount of operation of the accelerator pedal), irrespective of the currently established operation mode.

The above object may be achieved according to the principle of this invention, which provides a hybrid drive system for an automotive vehicle, comprising a drive power source consisting of an engine operated by combustion of a fuel, and an electric motor operated with an electric energy, and a controller for selectively establishing a plurality of operation modes in which the drive power source is placed in respective different operating states, and wherein the controller includes drive force control means for controlling the hybrid drive system so as to produce a substantially constant drive force for driving the vehicle, under the same running condition of the vehicle, irrespective of which one of the plurality of operation mode is currently established.

In the hybrid vehicle drive system of the present invention constructed as described above, the drive force control means is adapted to control the vehicle drive force to be substantially constant irrespective of the currently established operation mode, under the same running condition of the vehicle, for instance, with the same amount of operation of an accelerator pedal. The plurality of operation modes may include a motor-aided engine drive mode in which the electric motor as well as the engine is operated to drive the vehicle, so as to assist the engine so that the motor torque and the engine torque cooperate to produce the required overall vehicle drive force. Where the amount of electric energy stored in a suitable storage device is smaller than a lower limit, the electric motor cannot be used in the motor-aided engine drive mode. In this case, the drive force control means controls an appropriate device or devices of the hybrid drive system such as a throttle valve or throttle actuator and an automatic transmission, so that the drive force for driving the vehicle is substantially the same as in the motor-aided engine drive mode. This arrangement prevents a variation of the vehicle drive force unexpectedly to the vehicle operator, under the same running condition of the vehicle, with the same amount of operation of the accelerator pedal, for instance.

The principle of the present invention is applicable to various types of hybrid drive systems including an engine and an electric motor as the drive power source. For example, the hybrid drive system may include clutches which are selectively engaged and released to connect and disconnect a power transmitting path between the drive power source and the vehicle drive wheels. Alternatively, the hybrid drive system may use a planetary gear device or other synthesizing and distributing mechanism for synthesizing and distributing the outputs of the engine and the electric motor.

In one preferred form of the present invention, the hybrid drive system further comprises a manually operated member such as a selector switch which is operated by an operator of the vehicle for selecting, as one of the plurality of operation modes, a motor-aided engine drive mode in which the electric motor as well as the engine is operated to drive the vehicle. In this form of the invention, the controller establishes the motor-aided engine drive mode upon operation of the manually operated member, if an amount of electric energy stored for operating the electric motor is not smaller than a predetermined lower limit, and establishes a normal engine drive mode in which only the engine is operated to drive the vehicle upon operation of the manually operated member, if the amount of electric energy stored is smaller than the predetermined lower limit.

In one advantageous arrangement of the above preferred form of the invention, the hybrid drive system further comprises a throttle valve, and a throttle actuator for controlling an opening angle of the throttle valve under the control of the controller on the basis of a currently required output of the engine. In this instance, the drive force control means is adapted to control the throttle actuator, in the normal engine drive mode, according to a high-output relationship between the opening angle of the throttle valve and the currently required output of the engine, so that a drive force for driving the vehicle in the normal engine drive mode is substantially the same as in the motor-aided engine drive mode as long as the currently required output of the engine is substantially constant.

In another advantageous arrangement of the same preferred form of the invention, the hybrid drive system further comprises an automatic transmission operatively connected to the drive power source, and the drive force control means is adapted to control a speed ratio of the automatic transmission in the normal engine drive mode such that a drive force for driving the vehicle in the normal engine drive mode is substantially the same as in the motor-aided engine drive mode as long as the currently required output of the engine is substantially constant.

The automatic transmission may have a plurality of operating positions having respective different speed ratio values. In this case, the drive force control means selectively establishes the plurality of operating positions in the normal engine drive mode, on the basis of the currently required output of the engine and a running speed of the vehicle and according to a high-output shift boundary line representative of a relationship between the currently required output of the engine and the running speed, such that the automatic transmission is more likely to be shifted down in the normal engine drive mode than in the motor-aided engine drive mode.

Where the drive force control means is adapted to control both the opening angle of the throttle valve and the speed ratio of the automatic transmission in the normal engine drive mode, the drive force control means may be adapted to determine whether the currently required output of the engine is larger than a critical value corresponding to a fully open position of the throttle valve according to the high-output relationship. In this case, the drive force control means may be adapted to control the speed ratio of the automatic transmission in the normal engine drive mode if the currently required output of the engine is larger than the critical value, such that the drive force for driving the vehicle in the normal engine drive mode is substantially the same as in the motor-aided engine drive mode as long as the currently required output of the engine is substantially constant.

The currently required output of the engine may be represented by the operation amount of the accelerator pedal.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which:

FIG. 3 is a block indicating operating states of various coupling elements for establishing different operating positions of an automatic transmission in the hybrid drive system of FIG. 1;

FIG. 7 is a view indicating nine operating modes which are selectively established in the sub-routine of FIG. 6;

FIG. 8 is a flow chart illustrating a routine executed by a hybrid drive controller and an automatic transmission controller of the hybrid drive system;

FIG. 13 is a view indicating operating states of coupling elements for establishing operating positions of the automatic transmission in the hybrid drive system of FIG. 12.

DETAILED DESCRIPTION OF THE PREFERRED EMBODIMENTS

Figure 1:
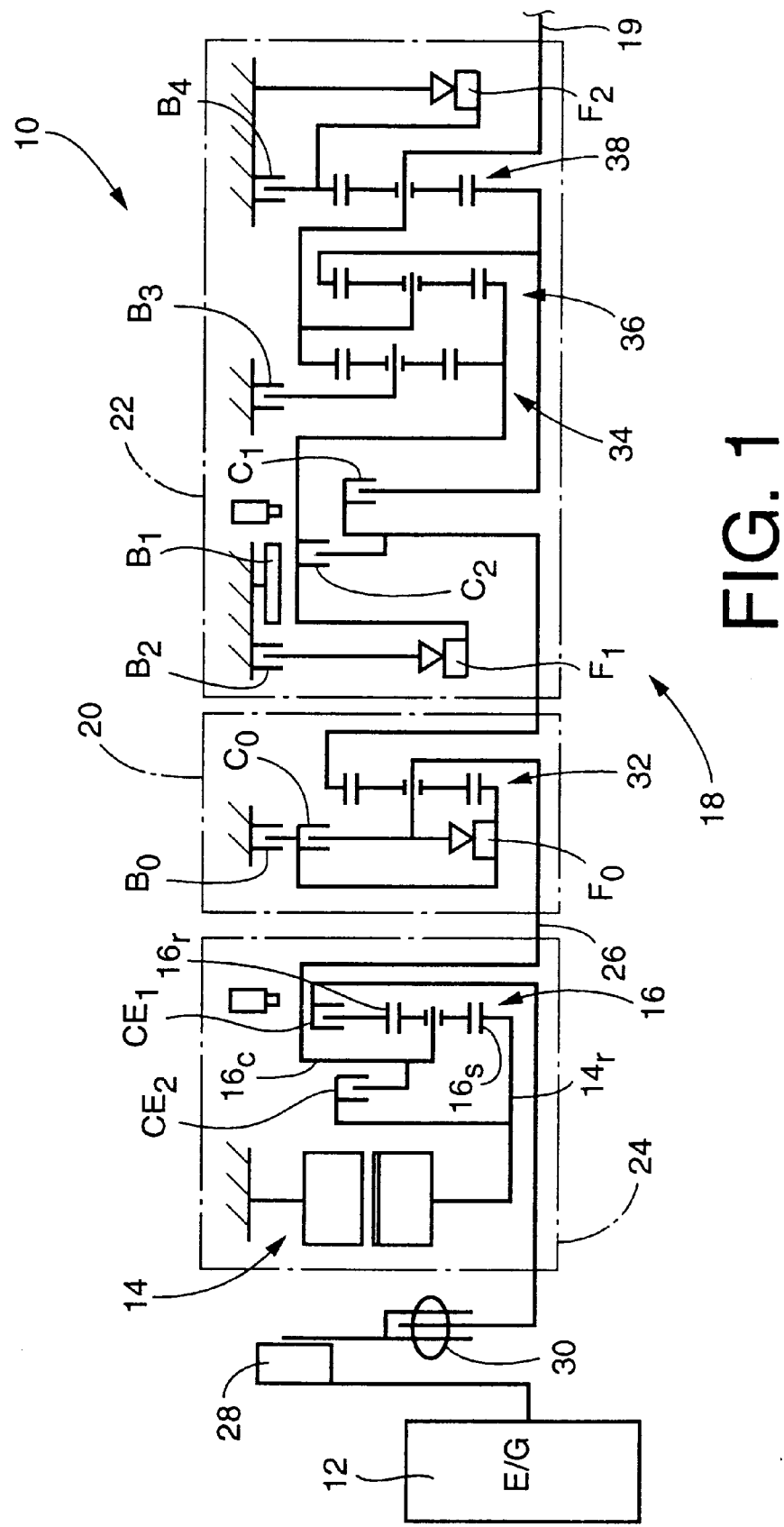
FIG. 1 is a schematic view illustrating a general arrangement of a hybrid drive system constructed according to one embodiment of the present invention.

Referring first to the schematic view of FIG. 1, there is shown a hybrid drive system 10 adapted for use on a front-engine rear-drive automotive vehicle (FR vehicle). The hybrid drive system 10 includes: an engine 12 such as an internal combustion engine, which is operated by combustion of a fuel; a motor/generator 14 which functions as an electric motor operated with an electric energy, and an electric generator; a planetary gear device 16 of single pinion type; and a power transmission device in the form of an automatic transmission 18. The engine 12, motor/generator 14, planetary gear device 16 and automatic transmission 18 are arranged in the longitudinal direction of the automotive vehicle. The automatic transmission 18 has an output shaft 19 which is operatively connected to rear right and left drive wheels of the vehicle through a propeller shaft and a differential gear device (which are not shown), to transmit a drive force to the drive wheels.

The planetary gear device 16 functions as a synthesizing/distributing mechanism for mechanically synthesizing and distributing a force, and cooperates with the motor/generator 14 to constitute an electrically controlled torque converter 24 as indicated in one-dot chain line in FIG. 1. The planetary gear device 16 includes: a first rotary element in the form of a ring gear 16r connected to the engine 12 through a first clutch CE1; a second rotary element in the form of a sun gear 16s connected to a rotor shaft 14r of the motor/generator 14; and a third rotary element in the form of carrier 16c connected to an output shaft, which is an input shaft 26 of the automatic transmission 18. The sun gear 16s and carrier 16c are connected to each other through a second clutch CE2.

The engine 12 is connected to the first clutch CE1 through a flywheel 28 and a damper 30. The flywheel 28 and the damper 30 function to absorb speed and torque variations of the engine 12. The damper 30 includes an elastic member such as a spring or a rubber member. The first and second clutches CE1, CE2 are friction type multiple-disk clutches which are engaged and released by respective hydraulic actuators.

The automatic transmission 18 is a combination of a front auxiliary transmission 20 and a rear primary transmission 22. The auxiliary transmission 20 consists of an overdrive planetary gear set 32 of single pinion type, while the primary transmission 22 consists of three planetary gear sets 34, 36, 38 connected to each other. The primary transmission 22 has five forward-drive positions and one rear-drive position. The auxiliary transmission 20 includes frictionally coupling clutch C0 and brake B0 operated by respective hydraulic actuators, and a one-way clutch F0.

The primary transmission 22 frictionally coupling clutches C1, C2 and brakes B1, B2, B3, B4 which are operated by respective hydraulic actuators, and one-way clutches F1, F2.

Figure 2:
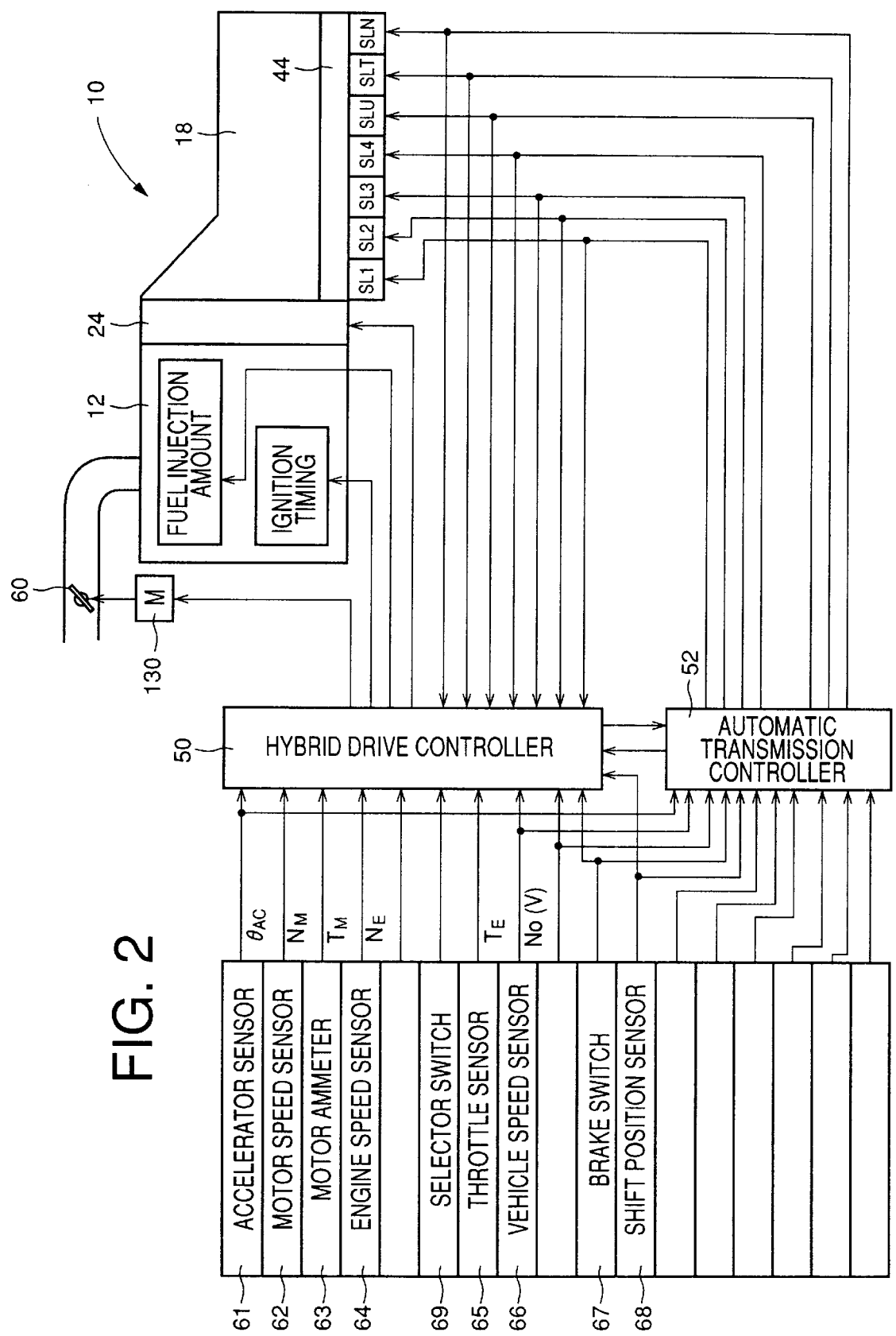
FIG. 2 is a view illustrating a control system used in the hybrid drive system of FIG. 1.

The automatic transmission 18 includes a hydraulic control device 44 incorporating solenoid-operated valves SL1–SL4 shown in FIG. 2. The solenoids of these solenoid-operated valves SL1–SL4 are selectively energized and deenergized to selectively engage and release the clutches C0, C1, C2 and brakes B0, B1, B2, B3, B4 for selectively establishing one of operating positions of the automatic transmission 18, as indicated in FIG. 3. The operating positions of the automatic transmission 18 consist of a neutral position "N", a rear-drive position "Rev", and five forward-drive positions, that is, first-speed position "1st", second-speed position "2nd", third-speed position "3rd", fourth-speed position "4th" and fifth-speed position "5th", as indicated in FIG. 3. The hydraulic control device 44 includes a manual shift valve which is mechanically connected to and operated by a shift lever. The clutches C0–C2 and brakes B0–B4 are controlled by the solenoid-operated valves SL1–SL4 and the manual shift valve. The shift lever has a parking position "P", a neutral position "N", a reverse position "R", a drive position "D", and engine braking positions such as a third-speed position "3", a second speed position "2" and a low-speed position Since the automatic transmission 18 and the electrically controlled torque converter 24 are symmetrical with respect to their centerline, only the upper halves of the transmission 28 and torque converter 24 are shown in FIG. 1.

In the table of FIG. 3, white circles indicate the engaged states of the clutches C, brakes B and one-way clutches F, while black circles indicate the engaged states of the clutch C0 and brakes B1, B4 when the shift lever is shifted to any one of the above-indicated engine braking positions. The absence of the white or black circles indicates the released states of the clutches C, brakes B and one-way clutches F.

The neutral and rear-drive positions "N", "Rev" of the automatic transmission 18 are established by the manual shift valve mechanically connected to the shift lever. When the shift lever is placed in any one of the engine braking positions, the transmission 18 is automatically shifted by the manual shift valve. When the shift lever 240 is placed in the drive position "D", the automatic transmission 18 is automatically placed in an appropriate one of the five forward-drive positions "1st" through "5th", with the solenoids of the solenoid-operated valves SL1–SL4 being selectively energized depending upon the running condition of the vehicle. The speed ratios of the five forward-drive positions of the automatic transmission 18 decrease in steps from the speed ratio of the first-speed position "1st" to the speed ratio of the fifth-speed position "5th", as indicated in FIG. 3, by way of example only. The fourth-speed position "4th" has a speed ratio $i_4$ which is equal to 1. The planetary gear set 32 of the auxiliary transmission 20 has a gear ratio $\rho$, which is the number of teeth $Z_S$ of the sun gear divided by the number of teeth $Z_R$ of the ring gear. The gear ratio $\rho$ is smaller than 1. The fifth-speed position "5th" has a speed ratio $i_5$ which is equal to $1/(1+\rho)$.

The rear-drive position "Rev" of the automatic transmission 18 has a speed ratio $i_R$ which is equal to 1 $1/\rho_2 \cdot \rho_3$, where $\rho_2$ and $\rho_3$ represent the gear ratios of the planetary gear sets 36, 38, respectively. The speed ratios of the rear-drive and forward-drive positions of the automatic transmission 18 are indicated in the table of FIG. 3, for illustrative purpose only.

As is apparent from the table of FIG. 3, the shifting actions of the automatic transmission 18 between the second-speed and third-speed positions "2nd" and "3rd" are effected by simultaneous engaging and releasing actions of the second and third brakes B2, B3. Described more specifically, the shift-up action from the second-speed position "2nd" to the third-speed position "3rd" is achieved by engaging the second brake B2 while releasing the third brake B3, and the shift-down action from the third-speed position "3rd" to the second-speed position "2nd" is achieved by engaging the third brake B3 while releasing the second brake B2. These shifting actions are referred to as "clutch-to-clutch" shifting actions, where appropriate. To achieve the clutch-to-clutch shifting actions in a smooth fashion, the hydraulic control device 44 is constructed as described below by reference to FIG. 4.

Figure 4:
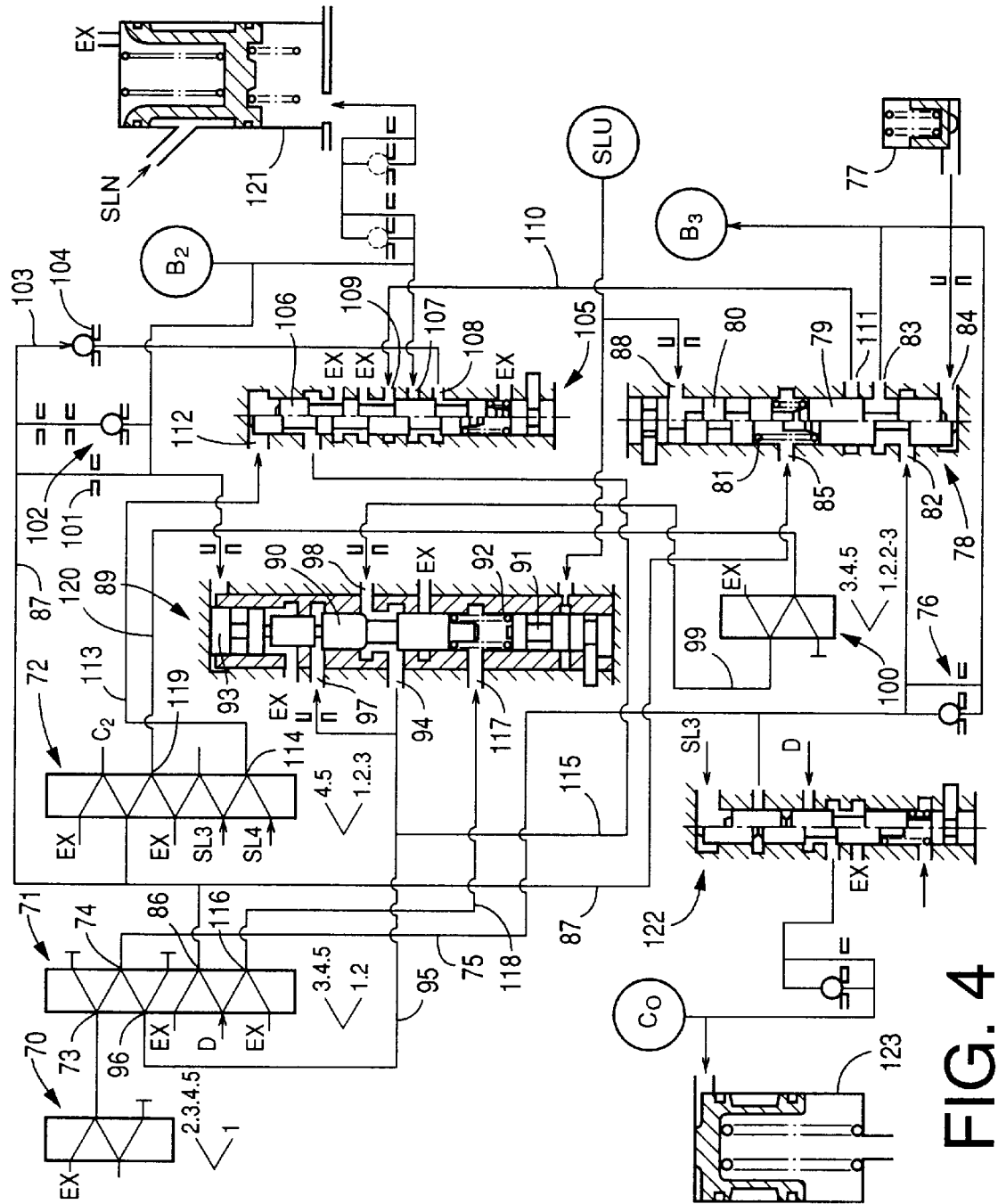
FIG. 4 is a view showing a part of a hydraulic system of the automatic transmission in the hybrid drive system of FIG. 1.

In FIG. 4, reference numerals 70, 71 and 72 denote a 1-2 shift valve, a 2-3 shift valve and a 3-4 shift valve, respectively. Working fluid communications of ports of these shift valves 70, 71, 72 are indicated below the shift valves as shown in FIG. 4 in which the five forward-drive positions "1st", "2nd", "3rd", "4th" and "5th" are represented as "1", "2", "3", "4" and "5", respectively.

The 2-3 shift valve 71 has an input port 73 and a brake port 74 which communicate with each other when the automatic transmission 18 is placed in the first-speed position "1st" or the second-speed position "2nd". The above-indicated third brake B3 is connected to the brake port 74 through an oil passage 75. The oil passage 75 has an orifice 76, and a damper valve 77 is connected between the orifice 76 and the third brake B3. The damper valve 77 functions to absorb a small amount of the working oil to thereby achieve a damping action upon an abrupt rise of a line pressure PL applied to the third brake B3.

Reference numeral 78 in FIG. 4 denotes a B-3 control valve which is provided to directly regulate the engaging pressure of the third brake B3. The B-3 control valve 78 includes a spool 79, a plunger 80, and a spring 81 disposed between the spool 79 and the plunger 80. The B-3 control valve 78 has an input port 82 which is opened and closed by the spool 79 and to which the oil passage 75 is connected, and an output port 83 which is selectively communicable with the input port 82 and to which the third brake B3 is connected. The output port 82 is connected to a feedback port 84 which is partially defined by one end of the spool 79.

The B-3 control valve 78 further has a port 85 communicating with a chamber in which the spring 81 is disposed. The 2-3 shift valve 71 has a port 86 which produces a hydraulic pressure output (line pressure PL) when the automatic transmission 18 is placed in one of the forward-drive positions "3rd", "4th" and "5th". The port 86 is connected to the port 85 of the B-3 control valve 78 through an oil passage 87. The B-3 control valve 78 further has a control port 88 adjacent to one end of the plunger 80, and a linear solenoid valve SLU (FIG. 2) is connected to the control port 88, so that a pilot pressure $P_{SLU}$ generated by the linear solenoid valve SLU is applied to the control port 88. In this arrangement, the hydraulic pressure is regulated by the B-3 control valve 78, on the basis of the elastic force of the spring 81 and the hydraulic pressure applied to the port 85. The elastic force of the spring 81 increases with an increase in the pilot pressure $P_{SLU}$ applied to the control port 88.

Reference numeral 89 in FIG. 4 denotes a 2-3 timing valve which includes a spool 90, a first plunger 91, a spring 92 disposed between the spool 90 and the first plunger 91, and a second plunger 93 disposed on the side of the spool 90 remote from the first plunger 91. the spool 90 has a small-diameter land and two large-diameter lands having a larger diameter than the small-diameter land. The 2-3 timing valve 89 has a port 94 formed at an intermediate portion thereof. An oil passage 95 is connected to the port 94, and to a port 96 of the 2-3 shift valve 71, which port 96 is communicated with the brake port 74 when the automatic transmission 18 is placed in one of the forward-drive positions "3rd", "4th" and "5th".

The oil passage 95 has a branch connected through an orifice to a port 97 of the 2-3 timing valve 89, which port 97 is open between the above-indicated small-diameter land one of the two large-diameter lands of the spool 90. The 2-3 timing valve 89 further has a port 98 which is selectively communicable with the above-indicated port 94 and which is connected through an oil passage 99 to a solenoid relay valve 100.

The 2-3 timing valve 89 further has a port which is adjacent to one end of the first plunger 91 and which is connected to the linear solenoid valve SLU, and another port which is adjacent to one end of the second plunger 93 and which is connected through an orifice to the second brake B2.

The above-indicated oil passage 87 is provided to supply the working oil to the second brake B2 and to discharge the oil from this second brake B2. The oil passage 87 is provided with an orifice 101 having a small diameter, and an orifice 102 with a check ball. The oil passage 87 has a branch 103 which is provided with an orifice 104 having a large diameter. The orifice 104 is provided with a check ball which is moved to an open position when the oil is discharged from the second brake B2. The branch 103 is connected to an orifice control valve 105 described below.

The orifice control valve 105 is provided to control the rate of discharge flow of the oil from the second brake B2. This orifice control valve 105 includes a spool 106, and has a port 107 at an intermediate position. The port 107 is opened and closed by the spool 106 and connected to the second brake B2. The orifice control valve 105 further has a port 108 formed at a position below the port 107 as seen in FIG. 4. The above-indicated branch 103 of the oil passage 87 is connected to the port 108. The orifice control valve 105 further has a port 109 formed at a position above the port 107 as seen in FIG. 4.

The port 108 is selectively communicable with a drain port and is connected through an oil passage 110 to a port 111 of the B-3 control valve 78. The port 111 is selectively communicable with the output port 83 to which the third brake B3 is connected.

The orifice control valve 105 further has a control port 112 formed adjacent to one end of the spool 106 remote from the spring which acts on the spool 106. This control port 112 is connected through an oil passage 113 to a port 114 of the 3-4 shift valve 72. This port 114 produces an output pressure of the third solenoid-operated valve SL3 when the automatic transmission 18 is placed in any one of the forward-drive positions "3rd", "2nd" and "1st", and produces an output pressure of the fourth solenoid-operated valve SL4 when the automatic transmission 18 is placed in the fourth-speed position "4th" or fifth-speed position "5th".

The oil passage 95 has a branch 115 which is connected to the orifice control valve 105. The branch 115 is selectively communicable with the drain port of the orifice control valve 105.

The 2-3 shift valve 71 has a port 116 which produces the hydraulic pressure output (line pressure PL) when the automatic transmission 18 is placed in the first-speed position "1st" or second-speed position "2nd". This port 116 is connected through an oil passage 118 to a port 117 of the 2-3 timing valve 89 which is open to a chamber in which the spring 92 is disposed. The 3-4 shift valve 72 has a port 119 which is communicated with the above-indicated oil passage 87 when the automatic transmission 18 is placed in any one of the positions "3rd", "2nd" and "1st". The port 119 is connected through an oil passage 120 to a solenoid relay valve 100.

Reference numeral 121 in FIG. 4 denotes an accumulator for the second brake B2. The accumulator 121 has a back-pressure chamber to which is applied an accumulator control pressure which is regulated on the basis of an output pressure of a linear solenoid valve SLN (FIG. 2) such that the accumulator control pressure increases with a decrease in the output pressure of the linear solenoid valve SLN. Accordingly, the hydraulic pressures for engaging and releasing the second brake B2 increase as a pilot pressure applied to the linear solenoid valve SLN decreases. Accumulators are also provided for the clutches C1, C2 and brake B0, and the above-indicated accumulator control pressure is applied to these accumulators, for controlling the pressures in clutches C1, C2 and brake B0 during the appropriate shifting actions of the automatic transmission 18.

Reference numeral 122 in FIG. 4 denotes a C-0 exhaust valve, and reference numeral 123 denotes an accumulator for the clutch C0. The C-0 exhaust valve 122 is operated to place the clutch C0 in the engaged state for applying an engine brake to the vehicle when the automatic transmission 18 is shifted to the second-speed position "2nd" while the shift lever is placed in the position "2".

In the hydraulic control device 44 constructed as described above, the engaging pressure $P_{B3}$ of the third brake B3 can be regulated directly by the B-3 control valve 78 when the port 111 of the B-3 control valve 78 is drained. The B-3 control valve 78 is controlled by the linear solenoid valve SLU to regulate the engaging pressure of the third brake B3.

When the spool 106 of the orifice control valve 105 is placed in its left position as indicated in FIG. 4, the working fluid can be discharged from the second brake B2 through the orifice control valve 105, and the releasing speed of the second brake B2 can be controlled by the controlled rate of flow of the fluid through the orifice control valve 105.

The clutch-to-clutch shift-up action of the automatic transmission 18 from the second-speed position "2nd" to the third-speed position "3rd" is effected by slowly releasing the third brake B3 while at the same time slowly engaging the second brake B2. To effectively reduce a shifting shock upon this clutch-to-clutch shift-up action, the hydraulic pressure $P_{B3}$ of the third brake B3 during its releasing action is controlled by the linear solenoid valve SLU on the basis of an input torque of the input shaft 26 of the automatic transmission 18. While the control of the hydraulic pressure PB3 on the basis of the input torque of the automatic transmission 18 can be effected in a real time manner by a feedback control technique, for example, the control may be effected on the input torque estimated upon initiation of the shift-up action of the automatic transmission 18.

As shown in FIG. 2, the hybrid drive system 10 includes a hybrid drive controller 50 as well as the automatic transmission controller 52 indicated above. Each of these controllers 50, 52 is constituted principally by a microcomputer incorporating a central processing unit (CPU), a random-access memory (RAM), and a read-only memory (ROM). The controllers 50, 52 receive output signals of various detectors or sensors which include: an accelerator sensor 61 for detecting an operaton amount $\theta_{AC}$ of an accelerator pedal; a motor speed sensor 62 for detecting speed $N_M$ of the motor/generator 14; a motor ammeter 63 for detecting an electric current of the motor/generator 14, which indicates torque $T_M$ of the motor 14; an engine speed sensor 64 for detecting speed $N_E$ of the engine 12; a throttle sensor 65 for detecting the opening angle $\theta_{TH}$ of a throttle valve 60, which indicates torque $T_E$ of the engine 12; a vehicle speed sensor 66 for detecting speed $N_O$ of the output shaft 19 of the automatic transmission 18, which indicates running speed V of the automotive vehicle; a brake switch 67 for detecting an operation of a brake pedal; and a shift position sensor 68 for detecting the currently selected position of the shift lever. The operation amount $\theta_{AC}$ represents the output of the engine 12 which is currently required by the vehicle operator.

The hybrid drive controller 50 is adapted to control the opening angle $\theta_{TH}$ of the throttle valve 60, and the fuel injection and ignition timing of the engine 12, so that the output of the engine 12 is controlled depending upon the specific running condition of the vehicle.

Figure 5:
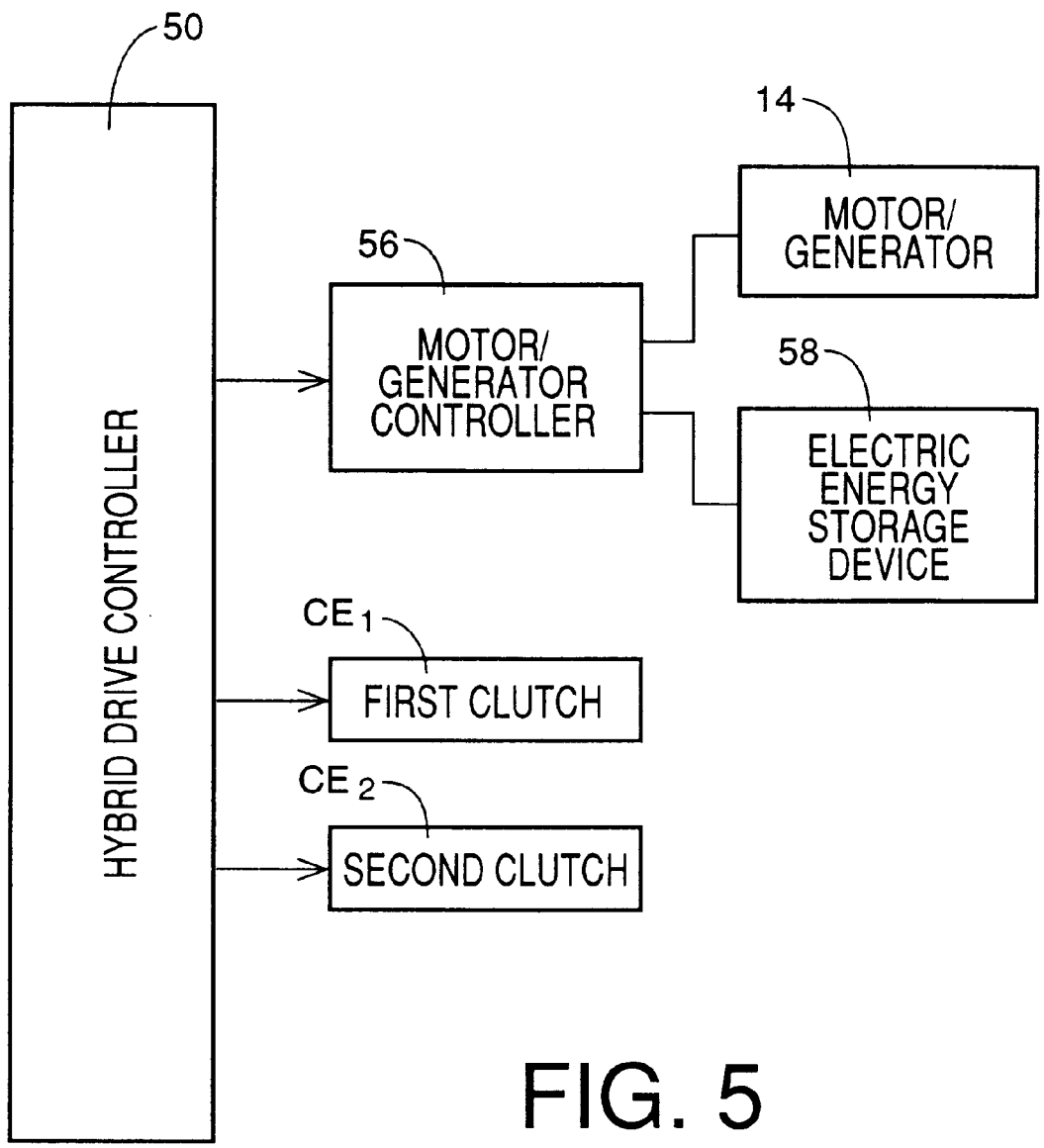
FIG. 5 is a block diagram showing connection between a hybrid drive controller and an electrically operated torque converter shown in FIG. 1.

The motor/generator 14 is connected to an electric energy storage device 58 through a motor/generator controller 56, as indicated in FIG. 5. The hybrid drive controller 50 is adapted to control the motor/generator controller 56 to place the motor/generator 14 selectively in one of a DRIVE state, a CHARGING state and a NON-LOAD or FREE state. In the DRIVE state, the motor/generator 14 is operated as an electric motor to provide a predetermined torque, with an electric energy being supplied thereto from the electric energy storage device 58. In the CHARGING state, the motor/generator 14 is operated as an electric generator or dynamo, by regenerative braking (i.e., electric braking torque of the motor/generator per se), so as to charge the electric energy storage device 58 with the electric energy. In the NON-LOAD or FREE state, the motor/generator 14 is placed in a non-load condition permitting free rotation of the rotor shaft 14r.

The first and second clutches CE1, CE2 are controlled by the hybrid drive controllers 50 through solenoid-operated valves of the hydraulic circuit. The automatic transmission 18 is controlled by the automatic transmission controller 52 through the above-indicated solenoid-operated valves SL1–SL4 and linear solenoid valves SLU, SLT and SLN of the hydraulic control device 44, so that the automatic transmission 18 is shifted to the optimum position depending upon the running condition of the vehicle, for example, depending upon the operation amount $\theta_{AC}$ of the accelerator pedal and the vehicle running speed V, and according to a selected one of predetermined shift patterns or shift boundary lines.

Figure 6:
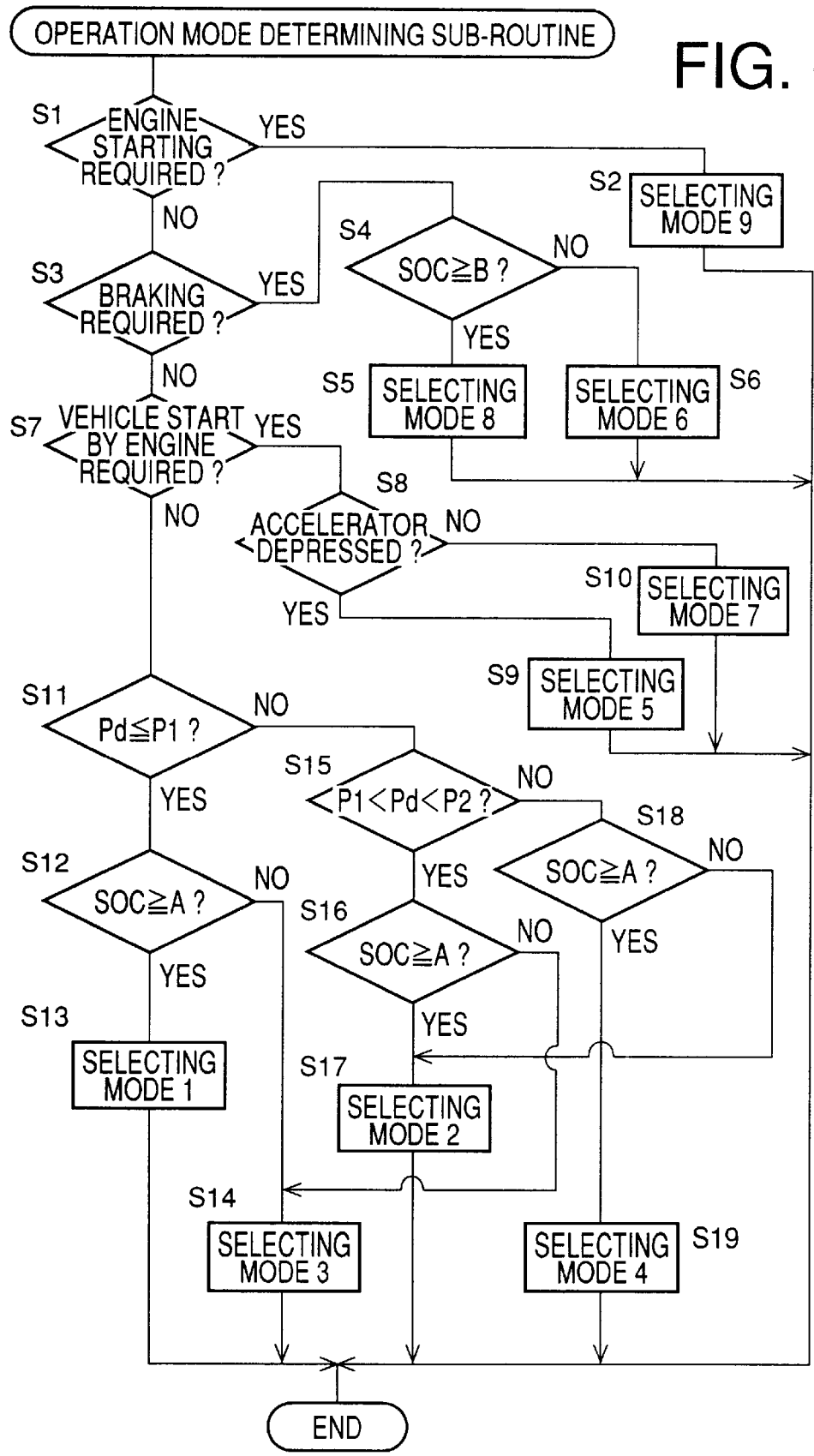
FIG. 6 is a flow chart illustrating an operation mode determining sub-routine executed by a hybrid drive controller of the hybrid drive system of FIG. 1.

The hybrid drive controller 50 is adapted to execute an operation mode determining sub-routine illustrated in the flow chart of FIG. 6, for selecting one of nine operation modes of the hybrid drive system 10 indicated in FIG. 7, and for operating the engine 12 and the electrically controlled torque converter 24 in the selected mode, as disclosed in U.S. patent application Ser. No. 08/746,483 filed Nov. 12, 1996. As shown in FIG. 2, the hybrid drive controller 50 is adapted to receive the output signals of the various sensors described above. The engine torque $T_E$ can be obtained from the opening $\theta_{TH}$ of the throttle valve 60 as detected by the throttle sensor 65, or from the amount of fuel injection into the engine 12. The motor torque $T_M$ can be obtained from the electric current of the motor/generator 14 as detected by the motor ammeter 63. An amount of electric energy SOC stored in the electric energy storage device 58 can be obtained from the electric current or charging efficiency of the motor/generator 14 when it is operated as the electric generator to charge the storage device 58.

The operation mode determining sub-routine of FIG. 6 is initiated with step S1 to determine whether there exists a command requiring the engine 12 to be started, for driving the vehicle with the engine 12 used as the drive power source or for operating the motor/generator 14 for charging the electric energy storage device 58.

If an affirmative decision (YES) is obtained in step S1, the control flow goes to step S2 to select an operation mode 9. In this operation mode 9, the first and second clutches CE1, CE2 are both engaged (turned ON) as indicated in the table of FIG. 7, and the motor/generator 14 is operated to start the engine 12 through the planetary gear device 16, with the fuel injection amount and other conditions of the engine 12 being suitably controlled.

When this operation mode 9 is selected while the vehicle is stationary, the starting of the engine 12 is effected with the automatic transmission 18 placed in the neutral position "N". When the operation mode 9 is selected during running of the vehicle with the motor/generator 14 as the drive power source as in an operation mode 1 in which the first clutch CE1 is in the released state, the first clutch CE1 is engaged, and the motor/generator 14 is operated so as to provide an output which is larger than the output necessary to drive the vehicle by a given surplus amount, so that the engine 12 is started by the surplus output of the motor/generator 14. Even when the vehicle is running, the engine 12 can be started in the operation mode 9 by temporarily placing the automatic transmission 18 in the neutral position. Thus, the engine 12 can be started by the motor/generator 14.

If a negative decision (NO) is obtained in step S1, that is, if no command requiring the starting of the engine 12 is present, the control flow goes to step S3 to determine whether brake application to the vehicle is required. For example, this determination may be effected by determining (a) whether a braking system of the vehicle is activated (whether the brake pedal has been depressed) or not, (b) whether the shift lever is placed in the engine braking position "L" or "2" with the operation amount $\theta_{AC}$ of the acceleration pedal being zero, or (c) whether the operation amount $\theta_{AC}$ of the accelerator pedal is zero. In the engine braking position "L"or "2", an engine brake is generally applied to the vehicle when the operation amount $\theta_{AC}$ of the accelerator pedal is zero.

If an affirmative decision (YES) is obtained in step S3, the control flow goes to step S4 to determine whether the amount of electric energy SOC stored in the electric energy storage device 58 is equal to or larger than a predetermined upper limit B. If an affirmative decision (YES) is obtained in step S4, the control flow goes to step S5 to select an operation mode 8. If a negative decision (NO) is obtained in step S4, the control flow goes to step S6 to select an operation mode 6. The upper limit B is an upper limit of the stored electric energy amount SOC below which the electric energy storage device 58 is permitted to be charged. The upper limit B is determined depending upon the charging and discharging efficiencies of the electric energy storage device 58. For instance, the upper limit B is about 80% of the full capacity of the electric energy storage device 58.

In the operation mode 8 selected in step S5, the first and second clutches CE1, CE2 are both engaged (turned ON), as indicated in the table of FIG. 7, and the motor/generator 14 is placed in the NON-LOAD state. Further, the engine 12 is turned OFF, that is, the throttle valve 60 is closed, and the fuel injection amount if zeroed. As a result, an engine brake due to the drag resistance of the engine 12 is applied to the vehicle, whereby the required amount of operation of the brake pedal by the vehicle operator is reduced, facilitating the control of the vehicle running. Since the motor/generator 14 is placed in the NON-LOAD state and permitted to rotate freely in the operation mode 8, the electric energy storage device 58 is protected from excessive charging and resulting deterioration of its charging and discharging efficiencies.

In the operation mode 6 selected in step S6, the first clutch CE1 is released (turned OFF) and the second clutch CE2 is engaged (turned ON), while the engine 12 is turned OFF, and the motor/generator 14 is placed in the CHARGING state, as indicated in the table of FIG. 7, whereby the motor/generator 14 is driven by a kinetic energy of the automotive vehicle, so as to charge the electric energy storage device 58 while applying a regenerative brake to the vehicle. The regenerative braking reduces the required amount of operation of the brake pedal and facilitates the control of the vehicle running.

In the operation mode 6 wherein the engine 12 is disconnected from the planetary gear device 16 with the first clutch CE1 placed in the released state, the energy loss of the vehicle due to the drag resistance of the engine 12 is prevented. Further, since the operation mode 6 is selected when the stored electric energy amount SOC is smaller than the upper limit B, the electric energy storage device 58 is protected from excessive charging and resulting deterioration of its charging and discharging efficiencies.

If a negative decision (NO) is obtained in step S3, that is, if no command requiring brake application to the vehicle is present, the control flow goes to step S7 to determine whether the vehicle is required to be started by operation of the engine 12. This determination may be effected by determining whether the vehicle is in a temporary stop during running of the vehicle with the engine 12 used as the drive power source as in an operation mode 3 (which will be described). For instance, the temporary stopping of the vehicle can be detected by checking if the output speed $N_O$ of the output shaft 19 of the automatic transmission 18 is zero. Namely, the output shaft speed $N_O$ is zero when the vehicle is stationary.

If an affirmative decision (YES) is obtained in step S7, the control flow goes to step S8 to determine whether the accelerator pedal is in a depressed state, more specifically, whether the operation amount $\theta_{AC}$ of the accelerator pedal is larger than a predetermined lower limit which is close to zero but larger than zero. If an affirmative decision (YES) is obtained in step S8, that is, if the accelerator pedal is in a depressed state, the control flow goes to step S9 to select an operation mode 5. If a negative decision (NO) is obtained in step S8, the control flow goes to step S10 to select an operation mode 7.

In the operation mode 5 selected in step S9, the first clutch CE1 is engaged (turned ON) and the second clutch CE2 is released (turned OFF), and the engine 12 is operated, as indicated in the table of FIG. 7, whereby the vehicle is started by the engine 12, with the regenerative braking torque of the motor/generator 14 being suitably controlled.

Described in detail, the ratios of the engine torque $T_E$, output torque of the planetary gear device 16 and motor torque $T_M$ are 1: (1+ρE): ρE, where ρE represents a gear ratio of the planetary gear device 16 (ρ=number of teeth of the sun gear 16s divided by number of teeth of the ring gear 16r). When the gear ratio ρE is about 0.5 (as in a common planetary gear device), for example, the torque of the motor/generator 14 is controlled to be equal to a half of the engine torque $T_E$, so that the torque about 1.5 times the engine torque $T_E$ is produced from the carrier 16c of the planetary gear device 16.

In the above arrangement, the vehicle can be started with a torque as large as (1+ρE)/ρE times the torque of the motor/generator 14. If the motor/generator 14 is held in the NON-LOAD state with no current applied to the motor, the output of the carrier 16c is zeroed with the rotor shaft 14r merely rotating in the reverse direction, whereby the vehicle is held stationary.

In the above case, the planetary gear device 16 functions as a vehicle start clutch and a torque booster. With the motor torque $T_M$ (regenerative braking torque) gradually increased from zero to increase a reaction force of the motor/generator 14, the vehicle can be smoothly started with the output torque which is (1+ρ) times the engine torque $T_E$.

The motor/generator 14 used in the hybrid drive system 10 of the present embodiment has a torque capacity which is about $\rho_E$ times the maximum torque of the engine 12. Namely, the torque capacity and size of the motor/generator 14 are minimized to minimize the size and cost of manufacture of the hybrid drive system 10, while assuring the required torque.

The present hybrid drive system 10 is further adapted so that the opening angle $\theta_{TH}$ of the throttle valve 60 and the fuel injection amount are increased with an increase in the motor torque $T_M$, for preventing stalling of the engine 12 due to a drop of the engine speed $N_E$ due to an increase in the reaction force of the motor/generator 14.

In the operation mode 7 selected in step S10, the first clutch CE1 is engaged (turned ON) and the second clutch CE2 is released (turned OFF), and the engine 12 is operated while the motor/generator 14 is placed in the NON-LOAD state so that the hybrid drive system 10 is placed in an electrically neutral state, as indicated in the table of FIG. 7. In this operation mode 7, the output of the carrier 16c is zeroed with the rotor shaft 14r of the motor/generator 14 rotating freely in the reverse direction. When this operation mode 7 is established during running of the vehicle with the engine 12 operated as the drive power source as in the operation mode 3, the stopping of the vehicle does not require the engine 12 to be turned OFF, and the vehicle can be started by the engine 12 as in the operation mode 5.

If a negative decision (NO) is obtained in step S7, that is, if the starting of the vehicle by the engine 12 is not required, the control flow goes to step S11 to determine whether a currently required output Pd of the hybrid drive system 10 is equal to or smaller than a predetermined first threshold value P1. The currently required output Pd is an output of the hybrid drive system 10 required to drive the vehicle against a running resistance. This currently required output Pd is calculated according to a predetermined data map or equation, on the basis of the operation amount $\theta_{AC}$ of the accelerator pedal, a rate of change of this value $\theta_{AC}$, running speed of the vehicle (speed $N_O$ of the output shaft 19), or the currently established operating position of the automatic transmission 18.

The predetermined first threshold value P1 is a boundary value of the output above which the vehicle is driven with only the engine 12 used as the drive power source and below which the vehicle is driven with only the motor/generator 14 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is equal to or smaller than the first threshold value P1, the control flow goes to step S12 to determine whether the stored electric energy amount SOC is equal to or larger than a predetermined lower limit A. If an affirmative decision (YES) is obtained in step S12, the control flow goes to step S13 to select an operation mode 1. If a negative decision (NO) is obtained in step S12, the control flow goes to step S14 to select an operation mode 3.

The lower limit A is a lower limit of the stored electric energy amount SOC above which the electric energy stored in the storage device 58 can be used to operate the motor/generator 14 as the drive power source. The lower limit A is determined depending upon the charging and discharging efficiencies of the storage device 58. For instance, the lower limit A is about 70% of the full capacity of the storage device 58.

In the operation mode 1 selected in step S13, the first clutch CE1 is released (turned OFF) and the second clutch CE2 is engaged (turned ON), and the engine 12 is turned OFF, while the motor/generator 14 is operated so as to provide the currently required output Pd, as indicated in the table of FIG. 7, so that the vehicle is driven with only the motor/generator 14 used as the drive power source.

In this operation mode 1, too, the engine 12 is disconnected from the planetary gear device 16, so that the energy loss due to the drag resistance of the engine 12 is prevented as in the operation mode 6, and the motor/generator 14 can be suitably operated with high efficiency with the automatic transmission 18 being suitably shifted.

It is also noted that the operation mode 1 is selected, that is, the motor/generator 14 is used as the drive power source, when the currently required output Pd is equal to or smaller than the first threshold value P1 while the electric energy amount SOC stored in the storage device 58 is equal to or larger than the lower limit A. In this condition, the energy efficiency is higher and the fuel consumption and the amount of exhaust emissions can be made smaller when the vehicle is driven by the motor/generator 14 (in the operation mode 1) than when the vehicle is driven by the engine 12 (in the operation mode 2). Further, the electric energy storage device 58 is protected from excessive energy consumption with the stored electric energy amount SOC falling below the lower limit A, which would result in deterioration of the charging and discharging efficiencies of the storage device 58.

In the operation mode 3 selected in step S14, the first and second clutches CE1, CE2 are both engaged (turned ON), and the engine 12 is turned ON, while the motor/generator 14 is placed in the CHARGING state to charge the electric energy storage device 58 with regenerative braking, as indicated in the table of FIG. 7, whereby the vehicle is driven by the output of the engine 12 while the electric energy storage device 58 is charged with the electric energy generated by the motor/generator 14. In this operation mode 3, the engine 12 is operated so as to provide an output larger than the currently required output Pd, and the electric current of the motor/generator 14 is controlled so that a surplus output of the engine 12 is consumed by the motor/generator 14 to charge the storage device 58.

If a negative decision (NO) is obtained in step S11, that is, if the currently required output Pd is larger than the first threshold value P1, the control flow goes to step S15 to determine whether the currently required output Pd is smaller than a predetermined second threshold P2 which is larger than the first threshold P1, that is, whether the currently required output Pd is larger than the first threshold P1 and smaller than the second threshold P2, namely, within a predetermined range between P1 and P2.

This second threshold value P2 is a boundary value of the output below which the vehicle is driven with only the engine 12 used as the drive power source and above which the vehicle is driven with both the engine 12 and the motor/generator 14 as the drive power sources. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is larger than the first threshold P1 and smaller than the second threshold P2, that is, if an affirmative decision (YES) is obtained in step S15, the control flow goes to step S16 to determine whether the storage electric energy amount SOC is equal to or larger than the above-indicated predetermined lower limit A. If an affirmative decision (YES) is obtained in step S16, the control flow goes to step S17 to select an operation mode 2. If a negative decision (NO) is obtained in step S16, the control flow goes to step S14 to select the operation mode 3 discussed above.

If the currently required output Pd is equal to or larger than the second threshold P2, that is, if a negative decision (NO) is obtained in step S15, the control flow goes to step S18 to determine whether the stored electric energy amount SOC is equal to or larger than the lower limit A. If an affirmative decision (YES) is obtained in step S18, the control flow goes to step S19 to select an operation mode 4. If a negative decision (NO) is obtained in step S18, the control flow goes to step S17 to select the operation mode 2.

In the operation mode 2 selected in step S17, the first and second clutches CE1, CE2 are both engaged (turned ON), and the engine 12 is operated so as to produce the currently required output Pd, while the motor/generator 14 is placed in the NON-LOAD state, as indicated in FIG. 7, whereby the vehicle is driven with only the engine 12 used as the drive power source.

In the operation mode 4 selected in step S19, the first and second clutches CE1, CE2 are both engaged (turned ON), and the engine 12 and the motor/generator 14 are both operated, as indicated in the table of FIG. 7, whereby the vehicle is driven with both the engine 12 and the motor/generator 14 used as the drive power sources.

In the operation mode 4 selected when the currently required output Pd is equal to the second threshold P2 or larger, the engine 12 and the motor/generator 14 are both operated as the drive power sources to drive the vehicle, so that the energy efficiency is less likely to be lowered than in the operation mode 1 or 2 in which either the engine 12 or the motor/generator 14 is used as the drive power source. In this respect, the fuel consumption and the exhaust gas emissions can be made smaller in this operation mode 4 than in the operation mode 1 or 2 when the currently required output Pd is equal to the second threshold P2 or larger. Further, since the operation mode 4 is selected only when the stored electric energy amount SOC is equal to or larger than the lower limit A, the electric energy storage device 58 is protected from excessive energy consumption with the stored energy amount SOC falling below the lower limit A, which would result in deterioration of the charging and discharging efficiencies of the storage device 58.

As described above, the operation modes 1–4 are selected in the following running states of the vehicle. When the electric energy amount SOC stored in the electric energy storage device 58 is not smaller than the lower limit A, the operation mode 1 is selected in step S13 to drive the vehicle with only the motor/generator 14 as the drive power source if the vehicle is in the low-load running state with the currently required output Pd being equal to or smaller than the first threshold P1. Further, the operation mode 2 is selected in step S17 to drive the vehicle with only the engine 12 as the drive power source if the vehicle is in the medium-load running state with the currently required output Pd being larger than the first threshold P1 and smaller than the second threshold P2, and the operation mode 4 is selected in step S19 to drive the vehicle with both of the engine 12 and the motor/generator 14 as the drive power sources if the vehicle is in the high-load running state with the currently required output Pd being equal to or larger than the second threshold P2.

When the stored electric energy amount SOC is smaller than the lower limit A, the operation mode 3 is selected in step S14 to drive the vehicle with only the engine 12 as the drive power source while at the same time charging the electric energy storage device 58 if the vehicle is in the medium-load running state with the currently required output Pd being smaller than the second threshold P2, and the operation mode 2 is selected in step S17 to drive the vehicle with only the engine 12 without charging the storage device 58 if the vehicle is in the high-load running state with the currently required output Pd being equal to or larger than the second threshold P2.

The operation mode 2 is selected in step S17 in the following two cases: 1) when the vehicle is in the medium-load running state wherein the currently required output Pd is larger than the first threshold P1 and smaller than the second threshold P2, while the stored electric energy amount SOC is not smaller than the lower limit A; and 2) when the vehicle is in the high-load running state wherein the currently required output Pd is equal to or larger than the second threshold P2, while the stored electric energy amount SOC is smaller than the lower limit A. In the medium-load running state of the vehicle, the energy efficiency is generally higher when the vehicle is driven by the engine 12 than when the vehicle is driven by the motor/generator 14. Accordingly, the fuel consumption and exhaust gas emission can be made smaller in the operation mode 2 than in the operation mode 1.

In the high-load running state, it is generally desirable to select the operation mode 4 in which the vehicle is driven by both of the engine 12 and the motor/generator 14. When the electric energy amount SOC stored in the electric energy storage device 58 is smaller than the lower limit A, however, it is desirable to select the operation mode 2, that is, to drive the vehicle with only the engine 12 used as the drive power source, in order to prevent deterioration of the charging and discharging efficiencies of the storage device 58 due to reduction of the stored electric energy amount SOC below the lower limit A.

The present hybrid drive system 10 has a MOTOR-AIDED ENGINE DRIVE mode, which is established by operation of an manually operated member in the form of a selector switch 69 as shown in FIG. 2, if the electric energy amount SOC stored in the electric energy storage device 58 is not smaller than the lower limit A, as described below in detail by reference to FIG. 8. In the MOTOR-AIDED ENGINE DRIVE mode, the motor/generator 14 as well as the engine 12 is operated to drive the vehicle, so that the motor torque $T_M$ constitutes a part of the overall vehicle drive torque which is generated depending upon the operation amount $\theta_{AC}$ of the accelerator pedal, by the drive power source, namely, by the engine 12 and the motor/generator 14, as indicated in FIG. 9.

When the selector switch 69 is operated to a MOTOR-AIDED ENGINE DRIVE position, by the vehicle operator who desires to establish the MOTOR-AIDED ENGINE DRIVE mode, a control routine illustrated in the flow chart of FIG. 8 is executed. This control routine, which is executed by the hybrid drive controller 50 and the automatic transmission controller 52, corresponds to drive force control means for controlling the hybrid drive system so as to produce a substantially constant drive force for driving the vehicle, under the same running condition of the vehicle, irrespective of the currently established operation mode.

The control routine of FIG. 8 is initiated with step SA1 to determine whether the electric energy amount SOC stored in the storage device 58 is equal to or larger than the lower limit A. As described above with respect to step S12 of FIG. 6, this lower limit A is a lower limit of the stored electric energy amount SOC above which the electric energy stored in the storage device 58 can be used to operate the motor/generator 14 as the drive power source. The lower limit A is determined depending upon the charging and discharging efficiencies of the storage device 58. For instance, the lower limit A is about 70% of the full capacity of the storage device 58.

Figure 9:
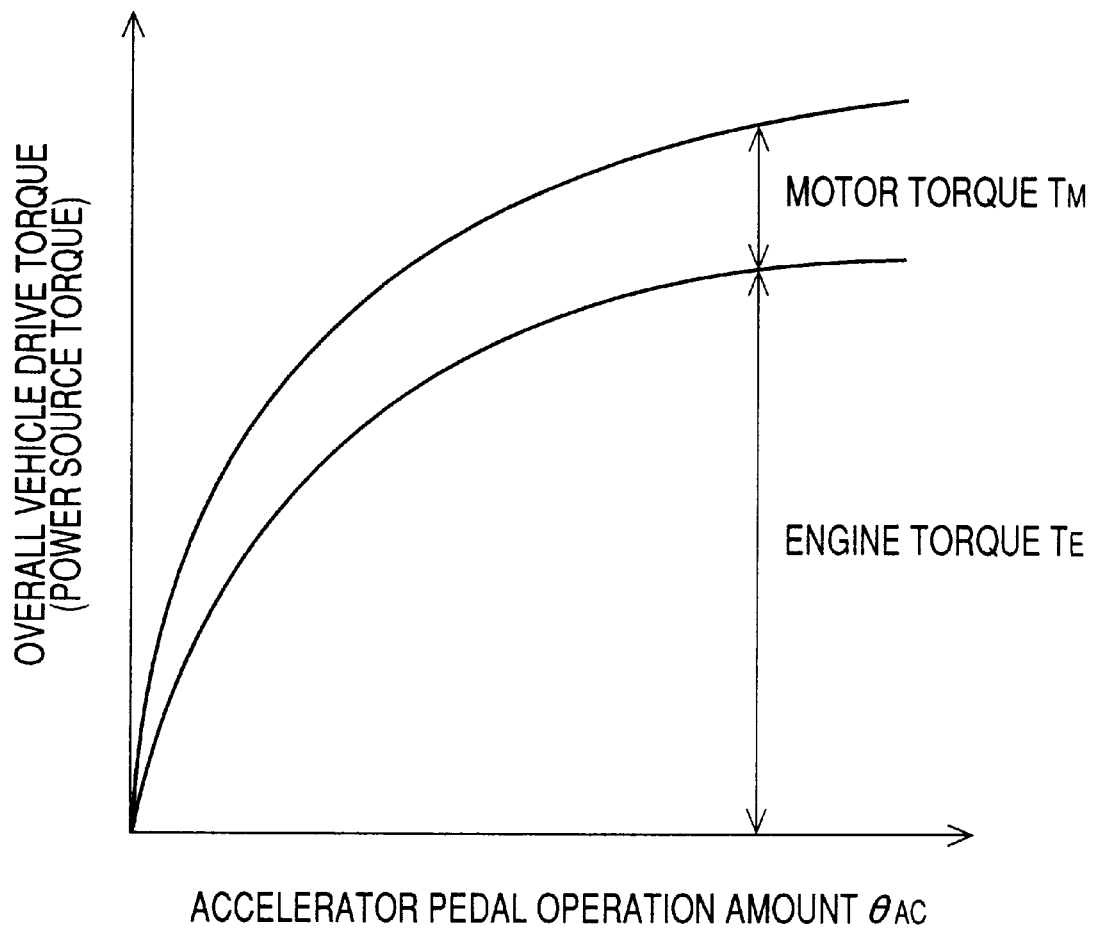
FIG. 9 is a view indicating a vehicle drive torque consisting of an engine torque and a motor torque, which vary with an amount of operation $\theta_{AC}$ of an accelerator pedal.

If an affirmative decision (YES) is obtained in step SA1, the control flow goes to step SA2 in which the MOTOR-AIDED ENGINE DRIVE mode is established in which the engine 12 and the motor/generator 14 are both operated as the drive power source, so as to provide the required overall vehicle drive torque consisting of the motor torque $T_M$ and the engine torque $T_E$, which are determined on the basis of the detected operation amount $\theta_{AC}$ of the accelerator pedal and according to a predetermined relationship between the operation amount $\theta_{AC}$ and the motor and engine torques $T_M$, $T_E$, as indicated in the graph of FIG. 9, by way of example. This relationship is determined depending upon the vehicle speed V, namely, varies with the vehicle speed V.

If a negative decision (NO) is obtained in step SA1, it means that the MOTOR-AIDED ENGINE DRIVE mode cannot be used since the motor/generator 14 cannot be operated so as to assist the engine 12. In this case, the control flow goes to step SA3 to determine whether the required vehicle drive torque or force can be obtained by increasing the opening angle $\theta_{TH}$ of the throttle valve 60 to increase the engine output $T_E$ by an amount corresponding to the motor torque $T_M$ which is to be obtained in the MOTOR-AIDED ENGINE DRIVE mode according to the predetermined relationship of FIG. 9. Described more specifically, the throttle valve 60 is operated by a throttle actuator 130, as shown in FIG. 2, on the basis of the operation amount $\theta_{AC}$ and according to a selected one of two predetermined $\theta_{TH}$-$\theta_{AC}$ relationships between the opening angle $\theta_{TH}$ of the throttle valve 60 and the operation amount $\theta_{AC}$ of the accelerator pedal. These two $\theta_{TH}$-$\theta_{AC}$ relationships consist of a normal $\theta_{TH}$-$\theta_{AC}$ relationship and a high-output $\theta_{TH}$-$\theta_{AC}$ relationship, as indicated by solid and broken lines in the graph of FIG. 10, respectively. When the high-output $\theta_{TH}$-$\theta_{AC}$ relationship is selected, the throttle opening angle $\theta_{TH}$ is increased by the throttle actuator 130 by an amount corresponding to the motor torque $T_M$ which is to be obtained in the MOTOR-AIDED ENGINE DRIVE mode in step SA2 when the stored electric energy amount SOC is is not smaller than the lower limit A.

When the stored electric energy amount SOC is smaller than the lower limit A, the high-output $\theta_{TH}$-$\theta_{AC}$ relationship is selected, and the throttle valve 60 is controlled by the throttle actuator 130 according to the selected high-output $\theta_{TH}$-$\theta_{AC}$ relationship under the control of the hybrid drive controller 50, as described below in steps SA4 and SA6. However, when the operation amount $\theta_{AC}$ of the accelerator pedal is larger than a critical value $\theta_{ACmax'}$ corresponding to the fully open position or 100% opening angle of the throttle valve 60 according to the high-output $\theta_{TH}$-$\theta_{AC}$ relationship, the engine torque $T_E$ cannot be increased by an amount corresponding to the motor torque $T_M$ of FIG. 9, by increasing the throttle opening angle $\theta_{TH}$. In view of this fact, the determination in step SA3 is effected by determining whether the operation amount $\theta_{AC}$ of the accelerator pedal currently detected by the accelerator sensor 61 is larger than the critical value $\theta_{ACmax'}$ corresponding to the fully open position of the throttle valve 60.

Figure 10:
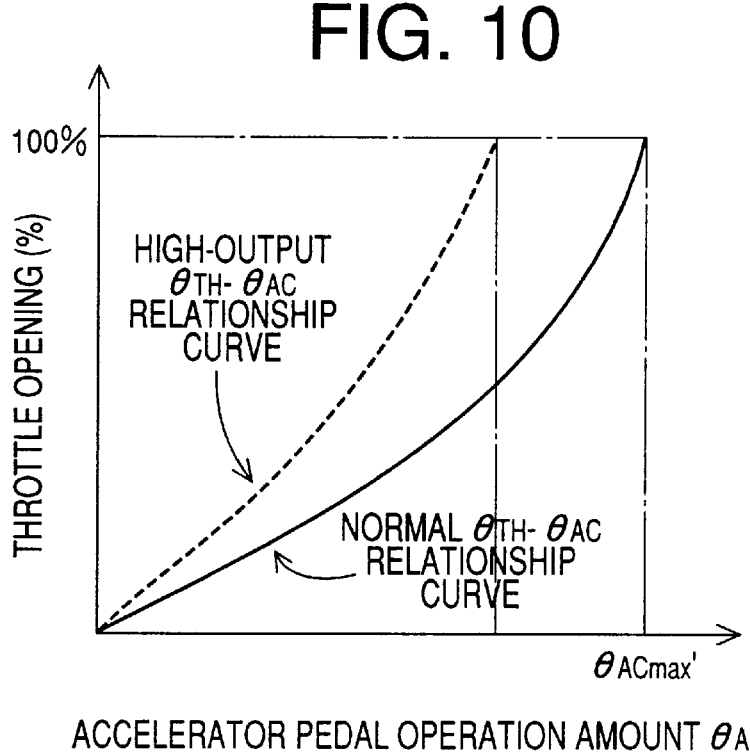
FIG. 10 is a view indicating relationships between the amount of operation $\theta_{AC}$ of the accelerator pedal and opening angle of a throttle valve.

If an affirmative decision (YES) is obtained in step SA3, the control flow goes to step SA4 in which the high-output $\theta_{TH}$-$\theta_{AC}$ relationship indicated by the broken line in FIG. 10 is selected, and only the engine 12 is operated to drive the vehicle, with the throttle valve 60 being controlled by the throttle actuator 130 according to the high-output $\theta_{TH}$-$\theta_{AC}$ relationship. Therefore, the engine torque $T_E$ is increased according to the high-output $\theta_{TH}$-$\theta_{AC}$ relationship by an amount corresponding to the motor torque $T_M$ which would be produced in the MOTOR-AIDED ENGINE DRIVE mode if the electric energy amount SOC is not smaller than the lower limit A. Thus, the overall vehicle drive force provided by only the engine 12 in step SA4 is substantially the same as in the MOTOR-AIDED ENGINE DRIVE mode in step SA2, even when only the engine 12 is used as the drive power source.

In the present embodiment, the MOTOR-AIDED ENGINE DRIVE mode is available over the entire range of the operation amount $\theta_{AC}$ of the accelerator pedal. However, the hybrid drive system 10 may be adapted such that the MOTOR-AIDED ENGINE DRIVE mode is available within a selected range of the accelerator pedal operation amount $\theta_{AC}$. In this case, the throttle valve 60 is controlled according to the high-output $\theta_{TH}$-$\theta_{AC}$ relationship in step SA4 within the selected range of the accelerator pedal operation amount $\theta_{AC}$.

Figure 11:
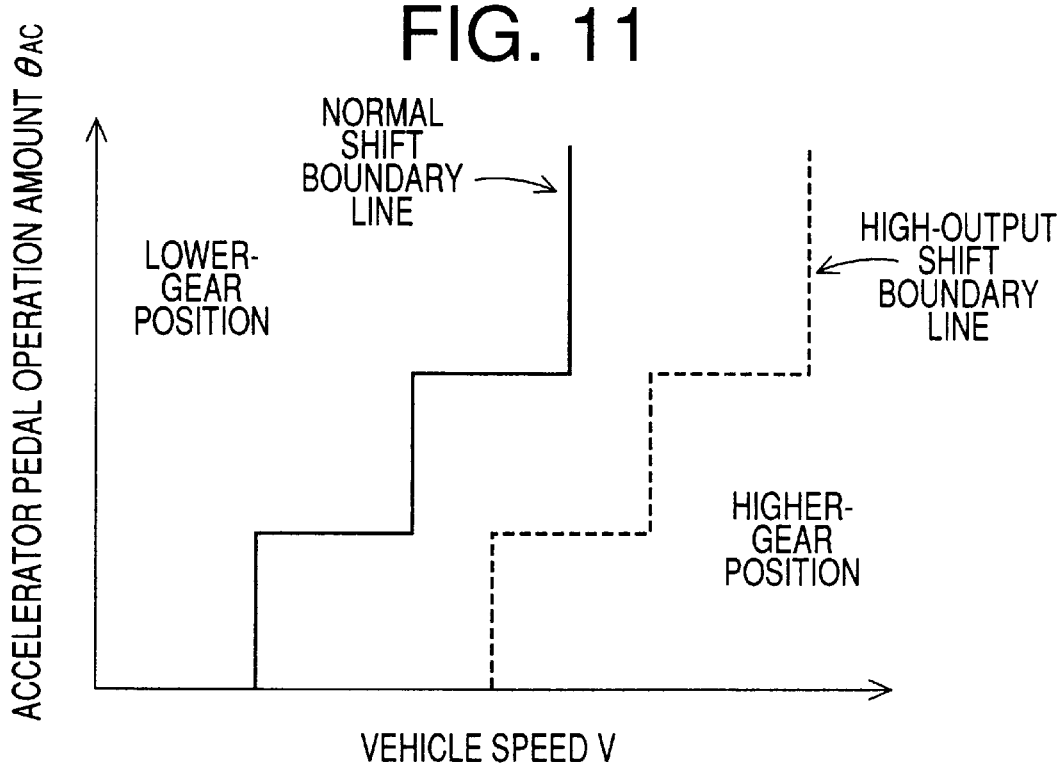
FIG. 11 is a view showing an example of shift boundary lines used to shift up or down the automatic transmission on the basis of vehicle running speed V and the accelerator pedal operation amount $\theta_{AC}$.

Step SA4 is followed by step SA5 in which a normal transmission shift pattern indicated by solid line in FIG. 11 is selected, and the automatic transmission 18 is controlled on the basis of the detected accelerator pedal operation amount $\theta_{AC}$ and vehicle running speed V and according to the selected normal transmission shift pattern. In step SA5, the normal transmission shift pattern is selected since the vehicle drive force required when the selector switch 69 is operated (to establish the MOTOR-AIDED ENGINE DRIVE mode) can be obtained by the engine 12 by increasing the throttle valve opening angle $\theta_{TH}$ according to the high-output $\theta_{TH}$-$\theta_{AC}$ relationship. However, a high-output transmission shift pattern indicated by broken line in FIG. 11 is selected when the required vehicle drive force cannot be obtained by the engine 12 by increasing the throttle valve opening angle $\theta_{TH}$, that is, when a negative decision (NO) is obtained in step SA3, as described below.

The transmission shift patterns are shift boundary lines representative of relationships between the accelerator pedal operation amount $\theta_{AC}$ and the vehicle speed V, as indicated in FIG. 11. The automatic transmission 18 is shifted up or down when a point defined by the detected values $\theta_{AC}$ and V has moved across the shift boundary lines, that is, a normal shift boundary line indicated by solid line or a high-output shift boundary line.

When the negative decision (NO) is obtained in step SA3, it means that the required vehicle drive force cannot be obtained by increasing the throttle opening angle $\theta_{TH}$ according to the high-output $\theta_{TH}$-$\theta_{AC}$ relationship, as indicated above. In this case, the control flow goes to step SA6, in which the throttle valve 60 is controlled by the throttle actuator 130 according to the high-output $\theta_{TH}$-$\theta_{AC}$ relationship, as in step SA4. Step SA6 is followed by step SA7 in which the automatic transmission 18 is controlled according to the high-output transmission shift pattern or shift boundary line indicated by broken line in FIG. 11. The high-output shift boundary line is offset to the right from the normal shift boundary line, as indicated in FIG. 11, so that the automatic transmission 18 is kept in the relatively low-gear position until the vehicle speed V is raised to a relatively high level, in order to maintain the relatively large output torque of the automatic transmission 18 at the relatively high vehicle speed V. Accordingly, the shortage of the engine torque $T_E$ according to the high-output $\theta_{TH}$-$\theta_{AC}$ relationship due to the saturation of the throttle opening angle $\theta_{TH}$ at the 100% position can be compensated for, by the shifting control of the automatic transmission 18 according to the high-output shift boundary line or pattern. The high-output shift pattern is determined so that the automatic transmission 18 is shifted down when the accelerator pedal operation amount $\theta_{AC}$ exceeds the critical value $\theta_{ACmax'}$ (explained above with respect to the high-output $\theta_{TH}$-$\theta_{AC}$ relationship), if the vehicle speed V is held constant. The high-output shift pattern is further determined so as to prevent an excessive rise of the engine speed. It is noted that the transmission shift patterns indicated in FIG. 11 are used for the automatic transmission 18 having different speed ratios. Where the hybrid drive system uses an automatic transmission whose speed ratio is continuously variable, the speed ratio of the continuously variable transmission is controlled so as to produce a relatively large output torque in step SA7.

In the present hybrid drive system 10 having the controllers 50, 52 adapted to execute the control routine of FIG. 8 upon operation of the selector switch 69, only the engine 12 is operated to drive the vehicle, with the throttle opening angle $\theta_{TH}$ being increased according to the high-output $\theta_{TH}$–$\theta_{AC}$ relationship, if the motor/generator 14 cannot be operated to drive the vehicle in the MOTOR-AIDED ENGINE DRIVE mode, with the stored electric energy amount SOC being smaller than the lower limit A. In this case, therefore, the vehicle drive force is substantially the same as in the MOTOR-AIDED ENGINE DRIVE mode, provided that the accelerator pedal operation amount $\theta_{AC}$ is constant. Therefore, the vehicle drive force does not vary unexpectedly to the vehicle operator, when the vehicle is running with the selector switch 69 placed in the MOTOR-AIDED ENGINE DRIVE position.

If the accelerator pedal operation amount $\theta_{AC}$ is larger than the critical value $\theta_{ACmax}$, and the engine torque $T_E$ (vehicle drive force) cannot be increased according to the high-output $\theta_{TH}$–$\theta_{AC}$ relationship, with the accelerator pedal operation amount $\theta_{AC}$ exceeding the critical value $\theta_{ACmax}$, corresponding to the fully open position of the throttle valve 60, the automatic transmission 18 is shifted down according to the high-output transmission shift pattern, so that the overall vehicle drive force is substantially the same as in the MOTOR-AIDED ENGINE DRIVE mode.

It will be understood that the MOTOR-AIDED ENGINE DRIVE mode established in step SA2 is considered to be one of a plurality of operation modes of the hybrid drive system 10, while a normal engine drive mode in which the engine 12 is operated in steps SA4 and SA6 to drive the vehicle with the throttle valve 60 being controlled by the throttle actuator 130 according to the high-output $\theta_{TH}$ and $\theta_{AC}$ is considered to be another operation mode. In these two modes, the drive power source consisting of the engine 12 and the motor/generator 14 is placed in different states. That is, both the engine 12 and the motor/generator 14 are operated to drive the vehicle in the MOTOR-AIDED ENGINE DRIVE mode in step SA2, while only the engine 12 is operated to drive the vehicle in the normal engine drive mode of steps SA4 and SA6.

Figure 12:
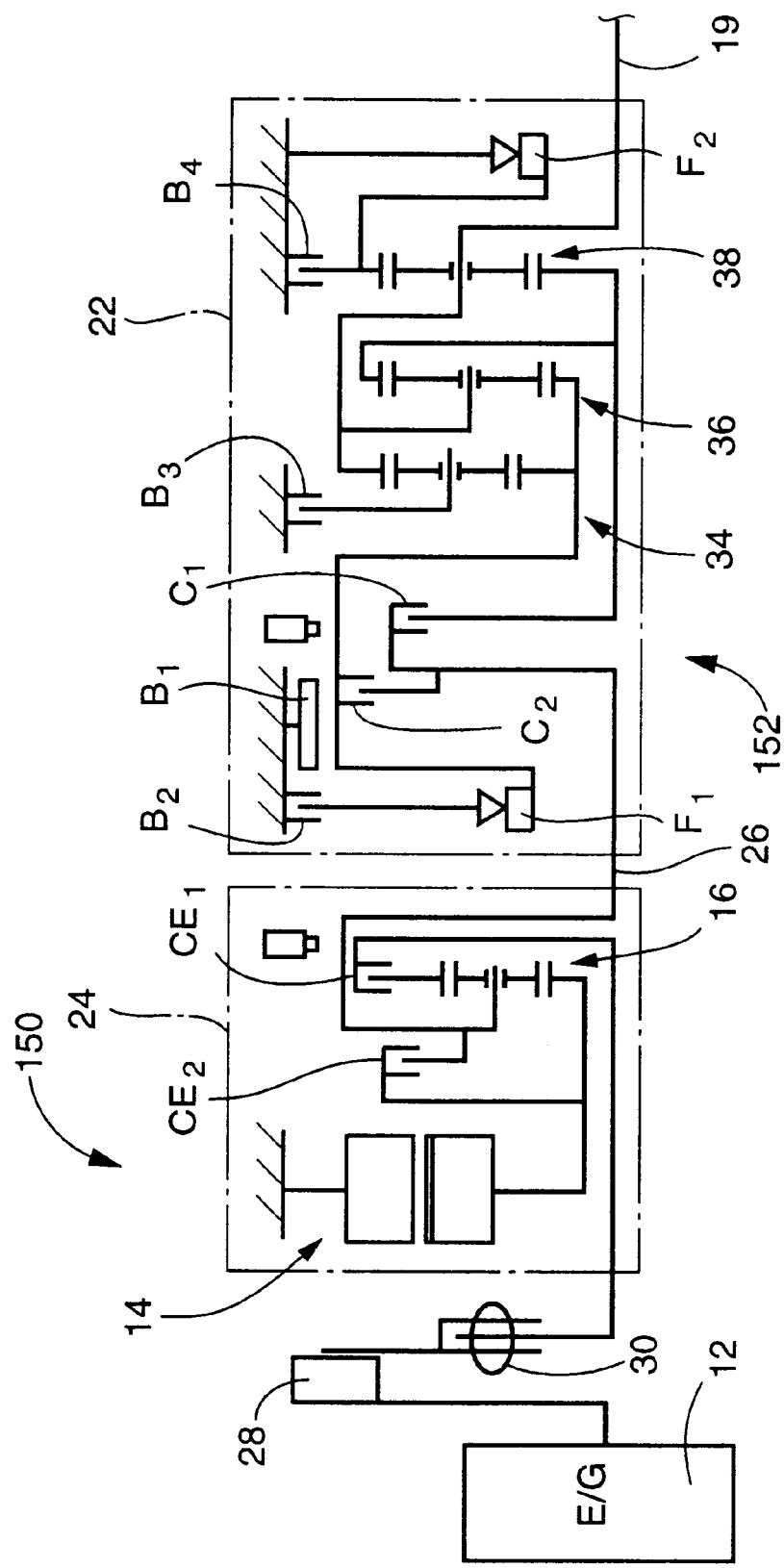
FIG. 12 is a view a schematic view showing a hybrid drive system according to another embodiment of this invention.

Reference is now made to FIG. 12, which show a hybrid drive system 150 constructed according to a second embodiment of this invention. In the hybrid drive system 10 in the first embodiments, the automatic transmission 18 has the auxiliary transmission 20 as well as the primary transmission 22. The hybrid drive system 150 shown in FIG. 12 uses an automatic transmission 152 which does not have the auxiliary transmission 20 and consists solely of the primary transmission 22. The automatic transmission 152 has four forward-drive positions and one rear-drive position, as indicated in FIG. 13.

While the presently preferred embodiments of the present invention have been described above by reference to the accompanying drawings, it is to be understood that the invention is not limited to the details of the illustrated embodiments, but may be otherwise embodied.

In the illustrated embodiments, the throttle valve 60 is controlled by the throttle actuator 130 according to the high-output $\theta_{TH}$ and $\theta_{AC}$ relationship, or the throttle valve 60 and the automatic transmission 18 are controlled according to the high-output $\theta_{TH}$ and $\theta_{AC}$ relationship and the high-output transmission shift pattern, respectively, if the MOTOR-AIDED ENGINE DRIVE mode is not available with the stored electric energy amount SOC being smaller than the lower limit, when the selector switch 69 is operated by the vehicle driver and placed in the MOTOR-AIDED ENGINE DRIVE position. However, other means may be used to assure that the vehicle drive force produced when the MOTOR-AIDED ENGINE DRIVE mode is not available can be made substantially equal to that produced in the MOTOR-AIDED ENGINE DRIVE mode. For instance, the amount of fuel injection by a fuel injector valve may be controlled according to a high-output relationship between the fuel injection amount and the accelerator pedal operation amount $\theta_C$. Namely, the throttle valve 60 to be controlled in steps SA4 and SA6 may be replaced by the fuel injector valve.

It is to be understood that the present invention may be embodied with various other changes, modifications and improvements, which may occur to those skilled in the art, without departing from the spirit and scope of the invention defined in the following claims:

What is claimed is:

1. A hybrid drive system for an automotive vehicle, comprising:

a drive power source consisting of an engine operated by combustion of a fuel, and an electric motor operated with an electric energy;

a controller for selectively establishing a plurality of operation modes in which said drive power source is placed in respective different operating states;

a throttle valve:

a throttle actuator for controlling said throttle valve under the control of said controller on the basis of a currently required output of said engine;

an automatic transmission operatively connected to said drive power source; and a manually operated member which is operated by an operator of the vehicle for selecting as one of said plurality of operation modes, a motor-aided engine drive mode in which said electric motor as well as said engine is operated to drive the vehicle, and wherein, upon operation of said manually operated member, said controller establishes said motor-aided engine drive mode, if an amount of electric energy stored for operating said electric motor is not smaller than a predetermined lower limit, and establishes a normal engine drive mode, as another of said plurality of operation modes, in which only said engine is operated to drive the vehicle, if said amount of electric energy stored is smaller than said predetermined lower limit, said controller including drive force control means for controlling said throttle actuator, said electric motor and a speed ratio of said automatic transmission, so as to produce a substantially constant drive force for driving the vehicle, irrespective of which one of said motor-aided engine drive mode and said normal engine drive mode is currently established, as long as said currently required output of said engine is substantially constant.

2. A hybrid drive system according to claim 1, further comprising an accelerator pedal which represents said currently required output of said engine.

3. A hybrid drive system for an automotive vehicle, comprising:

a drive power source consisting of an engine operated by combustion of a fuel, and an electric motor operated with an electric energy;

a controller for selectively establishing a plurality of operation modes in which said drive power source is placed in respective different operating states; and an automatic transmission operatively connected to said drive power source, and wherein said controller includes drive force control means for controlling a speed ratio of said automatic transmission such that the hybrid drive system produces a substantially constant drive force for driving the vehicle, irrespective of a currently established one of said plurality of operation modes, as long as a currently required output of said engine is substantially constant.

4. A hybrid drive system according to claim 3, further comprising an accelerator pedal which represents said currently required output of said engine.

5. A hybrid drive system for an automotive vehicle, comprising:

a drive power source consisting of an engine operated by combustion of a fuel, and an electric motor operated with an electric energy;

a controller for selectively establishing a plurality of operation modes in which said drive power source is placed in respective different operating states;

said controller including drive force control means for controlling the hybrid drive system so as to produce a substantially constant drive force for driving the vehicle, under a same running condition of the vehicle, irrespective of which one of said plurality of operation modes is currently established;

a manually operated member which is operated by an operator of the vehicle for selecting, as one of said plurality of operation modes, a motor-aided engine drive mode in which said electric motor as well as said engine is operated to drive the vehicle; and an automatic transmission operatively connected to said drive power source, and wherein said controller establishes said motor-aided engine drive mode, upon operation of said manually operated member, if an amount of electric energy stored for operating said electric motor is not smaller than a predetermined lower limit, and said controller establishes, as another of said plurality of operation modes, a normal engine drive mode in which only said engine is operated to drive the vehicle, upon operation of said manually operated member, if said amount of electric energy stored is smaller than said predetermined lower limit, said drive force control means controlling a speed ratio of said automatic transmission in said normal engine drive mode such that the drive force for driving the vehicle in said normal engine drive mode is substantially the same as in said motor-aided engine drive mode, as long as a currently required output of said engine is substantially constant.

6. A hybrid drive system according to claim 5, wherein said automatic transmission has a plurality of operating positions having respective different speed ratio values, and said drive force control means selectively establishes said plurality of operating positions in said normal engine drive mode, on the basis of said currently required output of the engine and a running speed of the vehicle and according to a high-output shift boundary line representative of a relationship between said currently required output of the engine and said running speed, such that said automatic transmission is shifted down at at least one of a larger value of said currently required output of said engine and a higher value of said running speed of the vehicle when in said normal engine drive mode than when in said motor-aided engine drive mode.

7. A hybrid drive system for an automotive vehicle, comprising:

a drive power source consisting of an engine operated by combustion of a fuel, and an electric motor operated with an electric energy;

a controller for selectively establishing a plurality of operation modes in which said drive power source is placed in respective different operating states;

said controller including drive force control means for controlling the hybrid drive system so as to produce a substantially constant drive force for driving the vehicle, under a same running condition of the vehicle, irrespective of which one of said plurality of operation modes is currently established;

a manually operated member which is operated by an operator of the vehicle for selecting, as one of said plurality of operation modes, a motor-aided engine drive mode in which said electric motor as well as said engine is operated to drive the vehicle;

a throttle valve;

a throttle actuator for controlling an opening angle of said throttle valve under the control of said controller on the basis of a currently required output of said engine; and an automatic transmission operatively connected to said drive power source, and wherein said controller establishes said motor-aided engine drive mode, upon operation of said manually operated member, if an amount of electric energy stored for operating said electric motor is not smaller than a predetermined lower limit, and said controller establishes a normal engine drive mode in which only said engine is operated to drive the vehicle upon operation of said manually operated member, if said amount of electric energy stored is smaller than said predetermined lower limit, said drive force control means controlling said throttle actuator, in said normal engine drive mode, according to a high-output relationship between said opening angle of said throttle valve and said currently required output of the engine, so that the drive force for driving the vehicle in said normal engine drive mode is substantially the same as in said motor-aided engine drive mode, as long as said currently required output of said engine is substantially constant, said drive force control means determining whether said currently required output of said engine is larger than a critical value corresponding to a fully open position of said throttle valve according to said high-output relationship, said drive force control means controlling a speed ratio of said automatic transmission in said normal engine drive mode if said currently required output of said engine is larger than said critical value, such that the drive force for driving the vehicle in said normal engine drive mode is substantially the same as in said motor-aided engine drive mode, as long as said currently required output of said engine is substantially constant.

8. A hybrid drive system according to claim 7, further comprising an accelerator pedal which represents said currently required output of said engine.

9. A hybrid drive system for an automotive vehicle, comprising:

a drive power source consisting of an engine operated by combustion of a fuel, and an electric motor operated with an electric energy;

a controller for selectively establishing a plurality of operation modes in which said drive power source is placed in respective different operating states;

a throttle valve;

a throttle actuator for controlling said throttle valve under the control of said controller on the basis of a currently required output of said engine;

an automatic transmission operatively connected to said drive power source;

a manually operated member which is operated by an operator of the vehicle for selecting, as one of said plurality of operation modes, a motor-aided engine drive mode in which said electric motor as well as said engine is operated to drive the vehicle, and wherein, upon operation of said manually operated member, said controller establishes said motor-aided engine drive mode, if an amount of electric energy stored for operating said electric motor is not smaller than a predetermined lower limit, and establishes a normal engine drive mode in which only said engine is operated to drive the vehicle, if said amount of electric energy stored is smaller than said predetermined lower limit, said controller including drive force control means for controlling said throttle actuator in said normal engine drive mode on the basis of said currently required output of said engine such that a drive force for driving the vehicle in said normal engine drive mode is substantially the same as in said motor-aided drive mode as long as said currently required output of said engine is substantially constant, said drive force control means controlling a speed ratio of said automatic transmission in said normal engine drive mode, if said drive force which is substantially the same as in said motor-aided engine drive mode cannot be obtained in said normal engine drive mode by controlling said throttle actuator, such that the drive force for driving the vehicle in said normal engine drive mode is substantially the same as in said motor-aided engine drive mode.

* * * * *